Nov. 22, 1932.  E. T. FERNGREN  1,888,496
CONTINUOUS TANK FURNACE
Original Filed Oct. 27, 1923  2 Sheets-Sheet 2
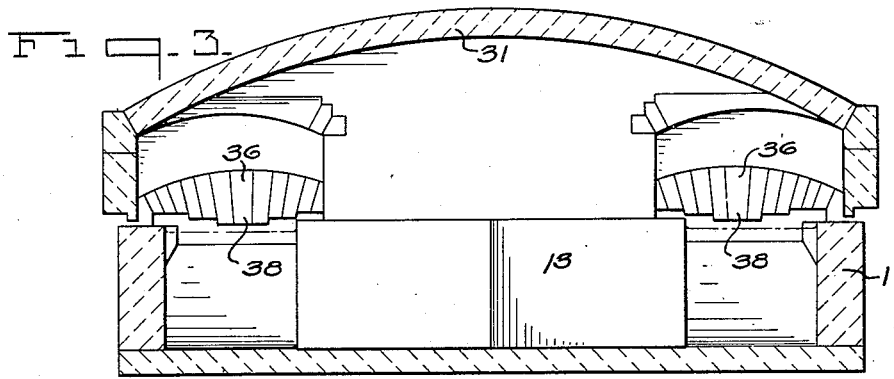
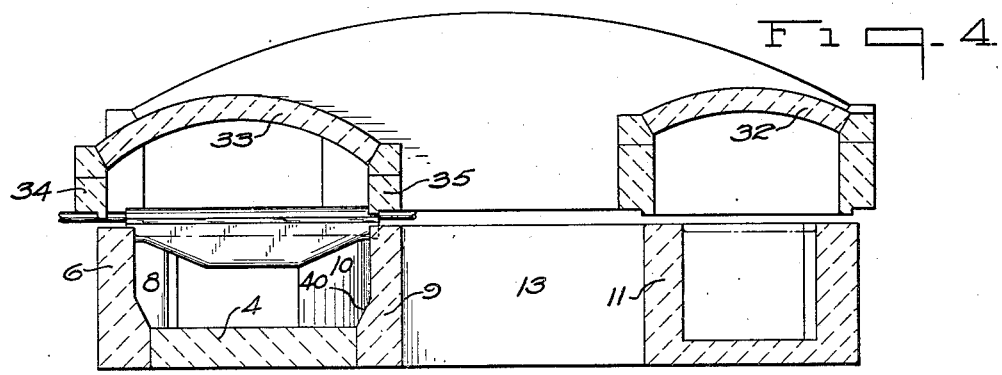
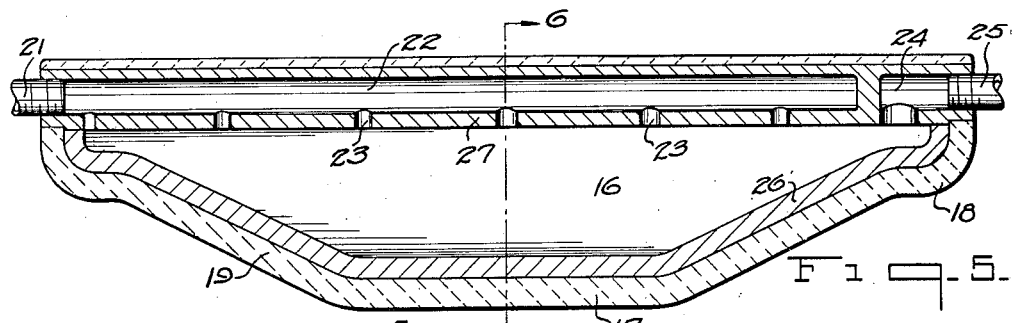
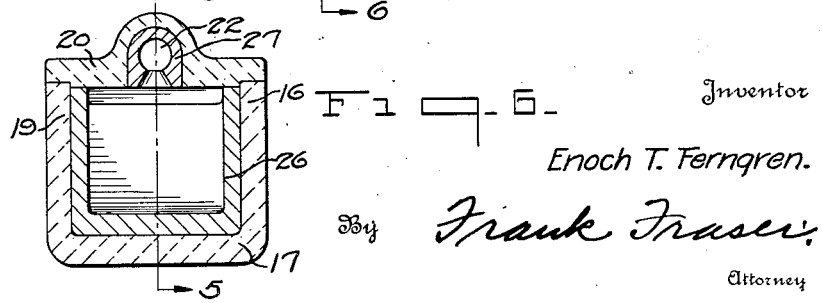
Inventor
Enoch T. Ferngren.
By Frank Fraser,
Attorney Patented Nov. 22, 1932

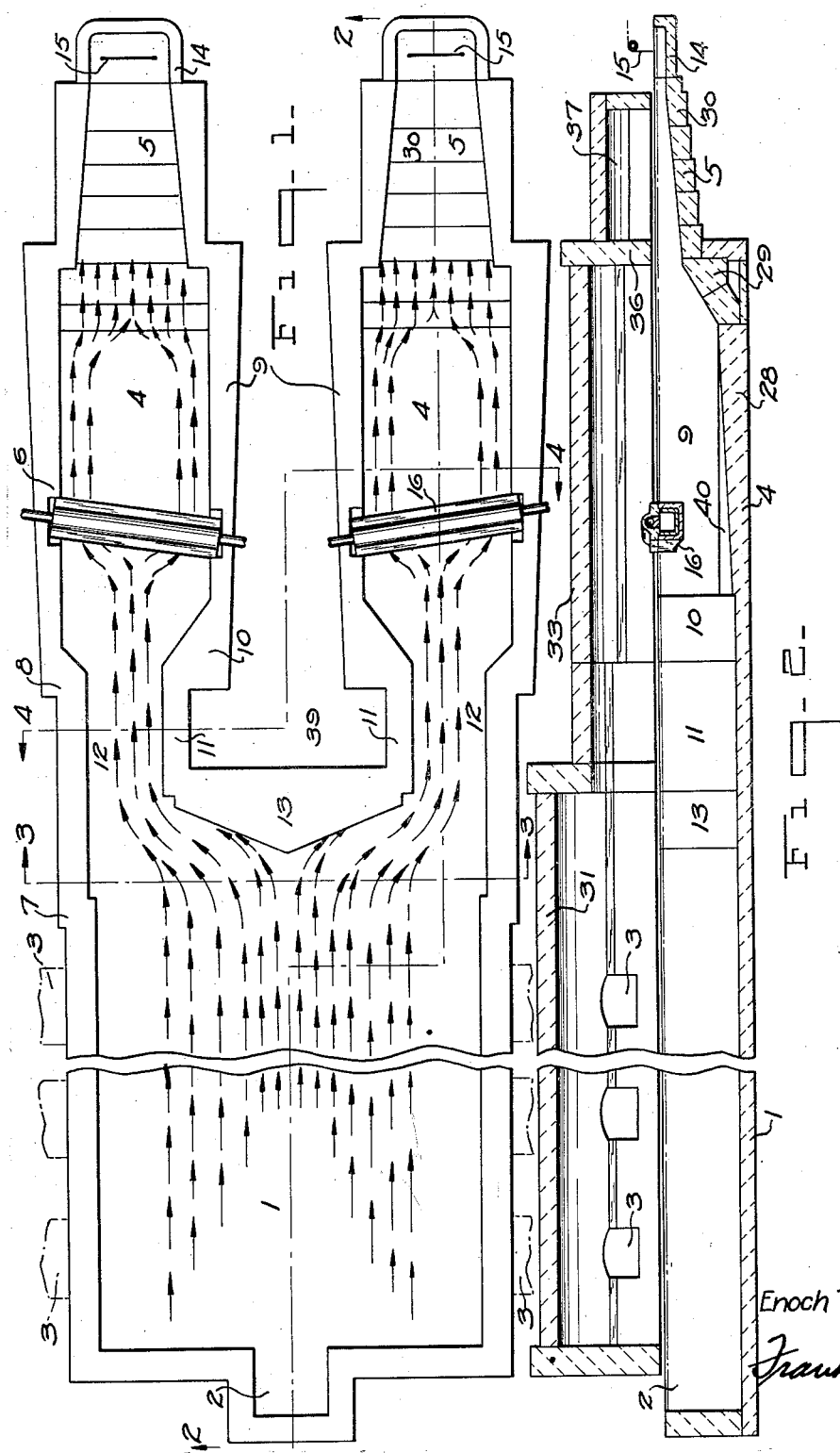

1,888,496

UNITED STATES PATENT OFFICE

ENOCH T. FERNGREN, OF TOLEDO, OHIO, ASSIGNOR TO LIBBEY-OWENS-FORD GLASS COMPANY, OF TOLEDO, OHIO, A CORPORATION OF OHIO

CONTINUOUS TANK FURNACE

Original application filed October 27, 1923, Serial No. 671,126. Divided and this application filed March 26, 1926. Serial No. 97,509.

This invention relates to improvements in continuous tank furnaces, and more particularly to such a furnace designed to furnish molten glass simultaneously to a plurality of sheet glass drawing machines.

In the process of drawing sheet glass, it has been found more economical to supply two or more machines from a single furnace, since a relatively small increase in the size of the tank, and the fuel consumption will enlarge its capacity sufficiently to supply the extra machine. In the most approved type of furnace now in use, a pair of parallel refining tanks arranged closely adjacent one another, form prolongations of the single melting tank in which the molten glass is produced. The flow of molten glass from the melting tank is divided between the two refining tanks through which it flows to the separate draw-pots which supply the sheet glass drawing machines.

In the use of such furnaces it has been found that there is a tendency for the higher temperatured glass from the melting tank, to flow along the inner adjacent sides of the two refining tanks, and cooling tanks, and toward the inner sides of the draw-pots, causing a progressive stagnation of the cooler glass in the outer side of each draw-pot, making it necessary to heat this glass to sustain the required amount of fluidity for the drawing operation.

Also there seems to develop a too rapid surface stratum movement of glass from the melting tank through each of the refining tanks to the draw-pot. This excessive surface movement of the glass from the melting end, which is undoubtedly caused by the heavy demands of the two sheet drawing units upon the melting capacity of the tank under conditions which promote a partial stagnation of all the other glass which is not in the path of the stream movement, will not give the freshly melted bath the proper time for settling and planing. This hotter glass, because of its greater mobility, is caused to flow toward the two draw-pots through channels formed by the stream current in the remainder of the glass contained in each refining tank, which cooler glass thus functions as a sort of supporting bed through which a river of more fluent glass will flow to supply the demands of the drawing machine.

The present improved form of furnace is designed to furnish a more even flow of more completely refined glass to each of the separate sheet glass producing machines. One object of the invention is to provide such a design of furnace construction, and such improved heat distribution, that the currents of hotter glass will be equally distributed at both the inner and outer sides of the refining and cooling tanks.

Another object is to provide for a deeper flow of glass through the tank system, to avoid stagnation of the lower strata of glass in the tanks, and also provide a longer refining period for all of the molten glass before it reaches the drawing machines.

Another object is the elimination of all longitudinal seams in the tank construction adjacent the outlet end where the refined glass flows to the draw-pot. This eliminates one cause of cold streaks in the molten glass supply.

Another object is to provide an improved form of air-cooled floater for properly directing the flowing glass within the refining tank.

Other objects and advantages will become apparent from the following detailed description of one approved form of the furnace.

In the accompanying drawings:

Fig. 1 is a plan view of the entire tank construction, a portion of the melting tank being broken away, and the heating chambers above the several tank portions being removed.

Fig. 2 is a longitudinal central section through the furnace, taken substantially on the line 2—2 in Fig. 1.

Fig. 3 is a transverse section through the melting tank, looking toward the two refining tanks, and taken substantially on the line 3—3 of Fig. 1.

Fig. 4 is a transverse section through one of the refining tanks and one of the intermediate channels, looking toward the melting tank, and taken substantially on the line 4—4 of Fig. 1.

Fig. 5 is a longitudinal vertical section through the improved floater, taken substantially on the line 5—5 of Fig. 6.

Fig. 6 is a transverse vertical section through this floater, taken substantially on the line 6—6 of Fig. 5.

This application is a division of my copending application, Serial No. 671,126, filed October 27, 1923, which application issued into Patent No. 1,581,338 on April 20, 1926.

The melting tank 1 is of the usual substantially rectangular form, the glass producing materials being fed into the tank through dog-house 2, and the melting heat being supplied through suitable regenerators indicated at 3. The refining tanks 4 and so-called cooling tanks 5 are formed as substantial continuations of the melting tank 1, the outer walls 6 of the refining tanks being substantially in line with the outer walls 7 of the melting tank, although they may be flared outwardly somewhat as at 8 to secure a somewhat greater width of refining tank. The adjacent inner walls 9 of the refining tanks are flared outwardly as at 10 near the inlet ends of the refining tanks to join with the parallel inner walls 11 of comparatively narrow channels 12 through which the glass flows from the melting tank to the two refining tanks. The walls 11 are joined by a wedge-shaped wall 13 which acts to deflect the central flow of glass from the melting tank into the two channels 12.

Due to the cooling and frictional retarding effects of the side walls of a tank, there is always a more rapid flow of hotter glass through the central portions of the tank. In Fig. 1 of the drawings this flow of hotter glass has been indicated by the procession of small arrows. In the ordinary form of double tank, of the type here illustrated, this flow of central hotter glass when divided between the two parallel refining tanks will have a tendency to travel along the inner adjacent sides of these tanks, and thence through the cooling chambers 5 and into the draw-pots 14 from which the glass sheets 15 are drawn upwardly. This will leave a body of nearly stagnant, and more viscid, glass along the outer sides of the refining and cooling tanks, and make it necessary to reheat the glass in the outer portions of the draw-pots or cooling tanks to obtain mobility and secure an approximately equal temperatured glass in both sides of these pots. In the present improved construction the flow of hotter glass will be divided by the wedge wall 13 and will flow through the relatively narrow channels 12. As in previous constructions, there will be a tendency for the hotter glass to flow along the inner sides of these channels, but since the channels are offset outwardly with respect to the center lines of refining tanks 4 which they supply, the current of hotter glass will be directed substantially centrally into the respective refining tanks, as indicated by the arrows. Also, since these currents of highly mobile hotter glass are thrown outwardly by wedge member 13 through the comparatively narrow channels 12, they will exert a sort of sweeping action on the outer and lower strata of glass in these channels, compelling a deeper and more complete flow of glass through the channels into the refining tanks. As the glass stream thus composed passes through each respective channel into the adjoining refining tank its velocity is somewhat reduced as it enters the refining tank because of the larger dimensions of this tank relative to the dimensions of the channel.

At an intermediate point in each channel 4, a floater 16 is positioned transversely of the flowing glass. This floater, as shown more particularly in Figs. 5 and 6, is much deeper at its central portion 17 than it is at the ends 18. The end portions 18 should be only deep enough to function as skimmers for the surface glass, but should not materially retard the flow of glass adjacent the sides of the tank. The central portion 17 of the floater projects downwardly to quite an extent into the molten glass, so that a large portion of the centrally flowing hot glass will be diverted toward the sides of the refining tank where an easier passage is provided. In this way the chilling and retarding effect of the side walls of the tank are counteracted and the partial stagnation of the glass along the sides of the tank is avoided. Since the inner adjacent walls of the refining tanks are apt to be somewhat hotter than the outer walls, due to the greater opportunity for radiation loss at the outer sides of the tanks, the floaters are positioned at a slight angle to the center line of the respective refining tanks, as indicated in Figs. 1 and 2, so as to divert a greater portion of the hotter glass to the respective outer walls of the refining tank.

The retarding, and dispersal toward the tank walls, of the upper central stratum of molten glass will give an opportunity for the lower strata, which can pass beneath portion 17 of the cooler, to pass forwardly and upwardly into the main glass stream. This movement is aided by the upwardly sloping bottom of the tank 4 as described hereinafter.

As shown more particularly in Figs. 5 and 6, the preferred form of floater to be used as above described is hollow, and provided with means for internally cooling the floater body by passing a current of cooling fluid therethrough. The floater comprises a main body portion 19 and a cover member 20, both preferably formed of a suitable refractory material such as fire-clay. A cooling fluid, such as air, is forced in through a pipe 21 at one end into a longitudinal passage 22 formed in the cover member 20, and this cooling fluid is directed downwardly through a series of flaring openings 23 into the hollow body portion 19 of the floater. The air escapes through a passage 24 and pipes 25 at the opposite end of the cover member. Preferably, both the body member 19 and the cover 20 are provided with linings of carbofrax or carborundum, or other suitable non-fragile, inert and thermally conductive composition, as at 26 and 27. These linings will not be injured or cracked by the direct contact of the cold air, and since the linings are formed of a highly conductive material they will readily transmit the heat from the outer clay portions of the floater body, so as to materially lower the temperature of the submerged portions of the floater. This will cause less expansion of the clay structure and form a protective film coating of chilled glass on the outside of the floater and prevent the penetration of or the washing away of the clay body by the molten glass, thus greatly prolonging the life of the floater, and eliminating contamination of the glass stream by dissolved clay, or the floating therein of stones of undissolved clay.

Due to the greater mass of the central portion of the floater, it will have a greater cooling effect on the centrally flowing body of glass which is hottest.

After the flowing glass has passed the floater 16, the side currents of hot glass will gradually be dispersed across the body of the tank, and the central flow of glass retarded by floater 16 will gradually recover its normal flowing speed, so that a substantially even flow of equally temperatured glass of greater depth and width than heretofore possible, will pass through cooling chamber 5 to the draw-pot 14.

It will furthermore be noted that the bottom wall 28 of the refining chamber gradually slopes upwardly toward the discharge end thereof so that the depth of the glass containing portion of the tank is gradually reduced. Adjacent the discharge end of the tank this slope is made considerably more abrupt by the angularly disposed thermally insulated blocks 29 which join with the much shallower bottom portion of cooling tank 5. The tank blocks are so formed as to close off the lower inner corners of tank 4 as at 40, where the side walls join the bottom walls. This facilitates the complete flow of the glass and avoids stagnant glass in these lower corners. It will also be noted that the bottom of cooling tank 5 also slopes upwardly to join with the shallow draw-pot 14. This gradual and progressive reduction in the depth of the body of glass as it flows toward the draw-pot, will progressively quicken the rate of flow and insure a deeper flow of glass and a more complete emptying out of the channels, thus largely avoiding the tendency for stagnation in what would otherwise be dead portions of the tanks.

It will also be noted that the bottom and side walls of the refining tank and cooling chamber become progressively thicker as they near the discharge end, thereby offsetting the loss in heat by conduction and radiation to which the decreasing depth of the glass body in these portions of the tank would otherwise be subject.

The blocks 29 and 30, forming the bottom of the discharge end of the refining tank and the cooling chamber 5, respectively, are of such length that they extend completely across the entire width of these tanks. In this way all longitudinal seams or joints between blocks are eliminated. It has been found that a somewhat lower temperature prevails along the seams or divisions between tank blocks, and when one of these seams runs parallel or substantially parallel to the flowing glass, a cold streak in the glass stream may be caused thereby. Also a much tougher glass, containing excessive amounts of alumina or silica, may be drawn off from the block edges into the glass stream, resulting in cords or veins in the glass sheet, or in a varying thickness of the sheet. By avoiding the use of all such longitudinal seams this cause for cold streaks, cords or variation in the nature of the flowing glass is eliminated.

The melting tank 1 is enclosed by a single arched heating chamber 31 from which furnace heat flows into the arched cover passages 32 over channels 12 and thence into the arched heating chambers 33 over the refining tanks. As will be noted in Fig. 4, the outer wall 34 of chamber 33 projects somewhat outwardly beyond the outer wall 6 of the refining tank, whereas the inner wall 35 of this chamber is substantially flush with the inner wall 9 of the refining tank. In this way the center line of the chamber 33 is thrown outwardly with respect to the center line of refining tank 4, so that a greater volume of heat will be directed above the glass in the outer portion of the tank 4. This is to offset the greater loss of heat by radiation from the outer walls of the refining tanks. The inner walls 9, due to their proximity, have a mutual heating effect and the heat loss at these sides of the tanks is not as great. The outer walls 6 of the refining tanks are also preferably made thicker than inner walls 9 to assist in retaining heat.

It will also be noted that the low-hanging arches 36 between chambers 33, and the arched chambers 37 above the cooling tanks 5, are made lower at their central portions 38 to direct more of the heat along the side bodies of glass in the cooling tanks 5.

The enlarged opening or well 39 between the inner walls 11 of channels 12, forms a sort of open chimney extending completely through the furnace structure, and the draft through this chimney 39 assists in cooling these inner walls and lengthens the life of this portion of the furnace.

The general purpose of this improved design of tank is to eliminate or counteract all causes for unequal temperatures at the inner and outer sides of the refining and cooling tanks. Also, a deeper flow of glass of greater uniformity or similarity in temperature composition and viscosity is enforced through the respective tanks, thus providing a longer refining interval for any given portion of the molten glass. As a result, a more equally mobile and homogeneous body of molten glass is delivered to the draw-pots 14 from which the glass sheets 15 are taken.

I claim:

1. A continuous tank furnace, wherein the bottom of that portion of the furnace through which the refined glass passes adjacent the discharge end of the furnace is formed of refractory blocks of a length substantially equal to the complete width of this portion of the tank.

2. A floater for use in a glass furnace, comprising an elongated member of refractory clay, having an interior chamber of similar configuration, lined with silicon-carbide, and means for flowing a cooling fluid through the chamber.

3. A floater for use in a glass furnace, comprising an elongated refractory member adapted to lie partially submerged in the molten glass, the member being deeper at its central portion than adjacent its ends, and means to interiorly cool the member.

4. A member adapted for use in glass furnaces and being partially submerged within the molten glass therein, said member having a pocket therein, and a cooler adapted to be inserted in the pocket, the walls of the cooler tapering from the top toward the bottom.

5. A floater for use in a glass furnace, including an elongated refractory member adapted to lie partially submerged in the molten glass, a lining of a highly conductive material therefor, said lining snugly fitting within the refractory member and being in contact therewith, and means for passing a cooling medium through said lining.

6. A floater for use in a glass furnace, including an elongated refractory member adapted to lie partially submerged in the molten glass, a lining of a highly conductive material therefor, and means for passing a cooling medium through said lining, said member being deeper at its central portion than adjacent its ends.

7. A tank furnace, the bottom of a portion thereof being formed of refractory blocks of a length substantially equal to the complete width of this portion of the furnace.

8. A tank furnace, including a portion through which the molten glass flows to the point of removal, the side walls of this portion of the furnace progressively increasing in thickness in the direction of advance of the molten glass.

9. A tank furnace, including a portion through which the molten glass flows to the point of removal, the bottom and side walls of this portion of the furnace progressively increasing in thickness in the direction of advance of the molten glass.

10. A tank furnace, including a portion through which the molten glass flows to the point of removal, the bottom wall of this portion of the furnace being inclined upwardly and progressively increasing in thickness in the direction of advance of the molten glass.

11. A tank furnace, including a melting tank and a flow channel communicating therewith, and an arch member for dividing the flow channel into two different sections, said arch member being constructed to direct more heat along the side portions of the molten glass in the flow channel than upon the central portion.

12. A tank furnace, including a melting tank and a flow channel communicating therewith, and an arch member for dividing the flow channel into two different sections, said arch member being lower at its central portion than at its ends.

13. An arch member for use in tank furnaces and adapted to extend transversely above the molten glass, said arch member being lower at its central portion than at its ends.

Signed at Toledo, in the county of Lucas, and State of Ohio, this 23rd day of March, 1926.

ENOCH T. FERNGREN.